United States Patent [19]

Shimizu et al.

[11] Patent Number: 5,755,995
[45] Date of Patent: May 26, 1998

[54] GUEST HOST LIQUID CRYSTAL COMPOSITION

[75] Inventors: Takaaki Shimizu; Tatsushi Kaneko, both of Niigati-ken; Masaharu Kaneko; Masami Kadowaki, both of Yokohama, all of Japan

[73] Assignees: Shin-Etsu Chemical Co., Ltd.; Mitsubishi Chemical Corporation, both of Tokyo, Japan

[21] Appl. No.: 851,654

[22] Filed: May 6, 1997

[30] Foreign Application Priority Data

May 9, 1996 [JP] Japan ................... 8-114726

[51] Int. Cl.$^6$ ............... C09K 19/34; C09K 19/00; C09K 19/32; G02F 1/13
[52] U.S. Cl. ............... 252/299.61; 252/299.1; 252/299.62
[58] Field of Search ............ 252/299.61, 299.62, 252/299.1

[56] References Cited

U.S. PATENT DOCUMENTS

| | | | |
|---|---|---|---|
| 5,453,217 | 9/1995 | Keneko et al. | 252/299.1 |
| 5,454,977 | 10/1995 | Shimizu et al. | 252/299.61 |
| 5,496,501 | 3/1996 | Shimizu et al. | 252/299.61 |
| 5,527,490 | 6/1996 | Kinsho et al. | 252/299.61 |
| 5,572,705 | 11/1996 | Kaneko et al. | 252/299.61 |
| 5,578,244 | 11/1996 | Shimizu et al. | 252/299.61 |
| 5,582,764 | 12/1996 | Nakashima et al. | 252/299.61 |
| 5,679,746 | 10/1997 | Shimizu et al. | 252/299.61 |

FOREIGN PATENT DOCUMENTS

| | | |
|---|---|---|
| 58138767 | 2/1982 | Japan. |
| 59004651 | 7/1982 | Japan. |
| 59022964 | 7/1982 | Japan. |
| 1043596 | 8/1987 | Japan. |
| 63-301850 | 1/1988 | Japan. |
| 5001286 | 10/1991 | Japan. |
| 5098259 | 10/1991 | Japan. |
| 6234975 | 12/1993 | Japan. |
| 0853469 | 6/1994 | Japan. |
| 7070148 | 6/1994 | Japan. |
| 7173176 | 10/1994 | Japan. |
| 8253767 | 12/1994 | Japan. |
| 7291978 | 2/1995 | Japan. |

Primary Examiner—C. H. Kelly
Attorney, Agent, or Firm—McAulay Fisher Nissen Goldberg & Kiel, LLP

[57] ABSTRACT

Described is a guest host liquid crystal composition comprising as a host liquid crystal a liquid crystal composition containing some of the compounds represented by the formulas (I) to (V) which will be described below; and at least four dichromatic dye compounds.

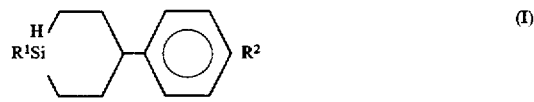

(I)

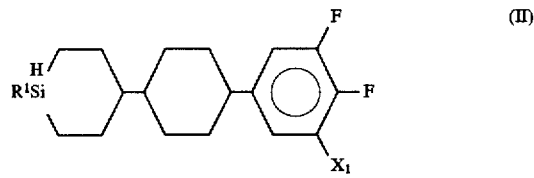

(II)

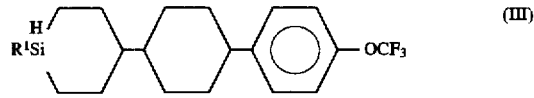

(III)

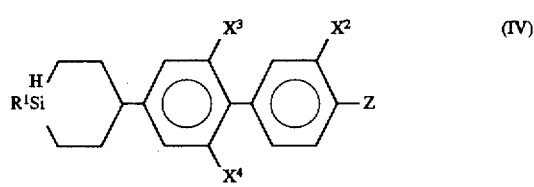

(IV)

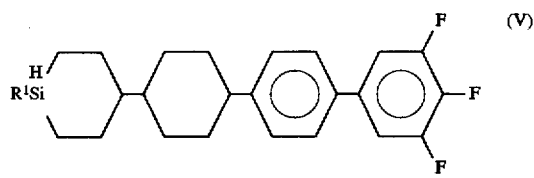

(V)

8 Claims, No Drawings

GUEST HOST LIQUID CRYSTAL COMPOSITION

BACKGROUND OF THE INVENTION

1. Field of the Invention

This invention relates to a guest host liquid crystal composition which is used for a liquid crystal display element and has positive dielectric anisotropy; and also to a liquid crystal display element using said liquid crystal composition.

2. Description of the Related Art

In recent years, accompanying with technical progress in the information and communication fields, the related portable instruments have become popular rapidly. As an indicator to be loaded on the instrument, a liquid crystal display element is spreading its applications, making the best use of its characteristics such as low weight, thin shape and low electric power consumption.

The liquid crystal display element is required to suppress its electricity consumption and to prolong the charging life of a battery. In this respect, a reflecting type liquid crystal panel using a guest host mode has high expectation.

Concerning the circuit which drives liquid crystals, voltage reduction is under way and also a guest host liquid crystal composition is required to reduce its driving voltage. In a liquid crystal display element driven by active matrix using a thin-film transistor or the like, a liquid crystal material must retain accumulated charges during the frame period. It is therefore inevitable to employ, for the liquid crystal material, a material which has an excellent capacity for holding accumulated charges during each frame period or so, that is, a material whose voltage retention is high. In addition, the liquid crystal material is also required to have a liquid phase extending even to a high temperature range from the viewpoint of resistance against environmental changes.

SUMMARY OF THE INVENTION

It is an object of the present invention to provide a guest host liquid crystal composition which can be driven at a voltage lower than that for a conventional material, has high voltage retention, and has a liquid crystal phase extending even to a high-temperature range; and also a liquid crystal display element using such composition.

There is thus provided a guest host liquid crystal composition which comprise as a host liquid crystal a liquid crystal composition containing:

0 to 15 mole % of a first component represented by the following formula (I):

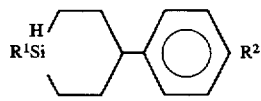

wherein $R^1$ represents a linear $C_{2-7}$ alkyl group and $R^2$ represents F or a linear $C_{1-3}$ alkoxy group, 20 to 70 mole % of a second component represented by the following formula (II):

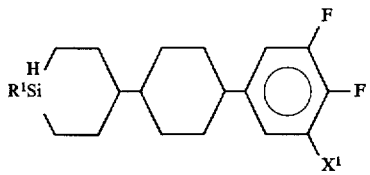

wherein $R^1$ is as defined for the general formula (I) and $X^1$ represents H or F.

5 to 40 mole % of a third component represented by the following formula (III):

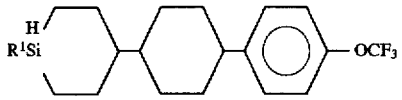

wherein $R^1$ is as defined for the general formula (I).

0 to 50 mole % of a fourth component represented by the following formula (IV):

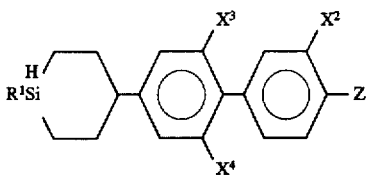

wherein $R^1$ is as defined for the general formula (I), $X^2$, $X^3$ and $X^4$ represent H or F, and, Z represents F, $OCF_3$ or $OCHF_2$, and 5 to 20 mole % of a fifth component represented by the following formula (V):

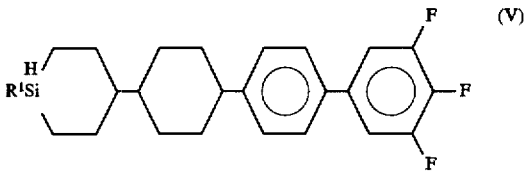

wherein $R^1$ is as defined for the general formula (I);

and at least one dichromatic dye compound selected from each of the below-described Group (A), Group (B), Group (C) and Group (D).

Group (A) consists of azo-base dichromatic dye compounds represented by the following formula (VI):

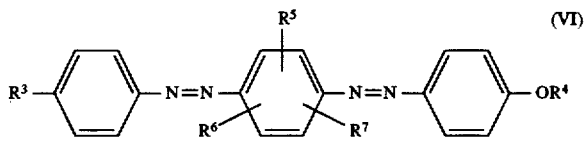

wherein $R^3$ represents a hydrogen atom, a linear or branched $C_{1-10}$ alkyl or alkoxyl group, a $C_{2-10}$ alkoxyalkyl group, a halogen atom such as fluorine, chlorine or bromine, or a cyclohexyl or phenyl group which may be substituted by the above alkyl, alkoxy or alkoxyalkyl group or the halogen atom; $R^4$ represents a linear or branched $C_{1-10}$ alkyl or alkoxy group, a $C_{2-10}$ alkoxyalkyl group, a halogen atom such as fluorine, chlorine or bromine, or a cyclohexylmethyl or benzyl group which may be substituted by the above alkyl, alkoxy or alkoxyalkyl group, or the halogen atom; $R^5$ to $R^7$ each represents a hydrogen atom, a methyl group, a methoxy group or a halogen atom and when R and R are coupled to an adjacent carbon, they may form an aromatic ring which is a part of a naphthalene ring.

Group (B) consists of azo-base dichromatic dye compounds represented by the following formula (VII):

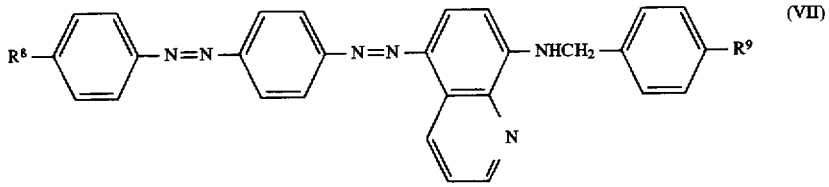

wherein $R^8$ and $R^9$ each represents a hydrogen atom, a linear or branched $C_{1-10}$ alkyl or alkoxyl group, a $C_{2-10}$ alkoxyalkyl group, a halogen atom such as fluorine, chlorine or bromine, or a cyclohexyl or phenyl group which may be substituted by the above alkyl, alkoxy or alkoxyalkyl group or the halogen atom.

Group (C) consists of azo-base dichromatic dye compounds represented by the following formula (VIII);

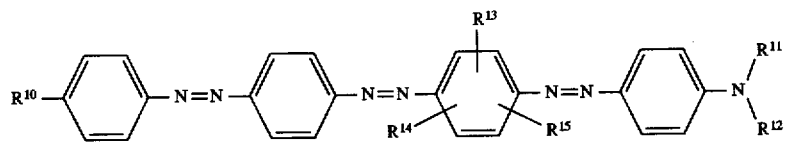

wherein $R^{10}$ represents a hydrogen atom, a linear or branched $C_{1-10}$ alkyl or alkoxyl group, a $C_{2-10}$ alkoxyalkyl group, a halogen atom such as fluorine, chlorine or bromine, or a cyclohexyl or phenyl group which may be substituted by the above alkyl, alkoxy or alkoxyalkyl group or the halogen atom; $R^{11}$ and $R^{12}$ each represents a linear or branched $C_{1-10}$ alkyl group; and $R^{13}$ to $R^{15}$ each represents a hydrogen atom, a methyl group, a methoxy group or a halogen atom and when $R^{14}$ and $R^{15}$ are coupled to an adjacent carbon, they may form an aromatic ring which is a part of a naphthalene ring; and anthraquinone-base dichromatic dye compounds represented by the following formula (IX):

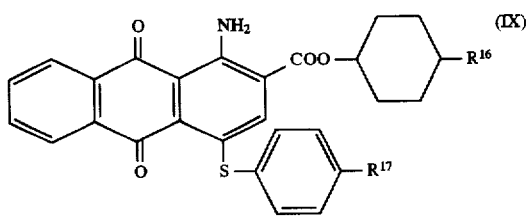

wherein $R^{16}$ and $R^{17}$ each represents a hydrogen atom, a linear or branched $C_{1-10}$ alkyl or alkoxyl group, a $C_{2-10}$ alkoxyalkyl group, a halogen atom such as fluorine, chlorine or bromine, or a cyclohexyl or phenyl group which may be substituted by the above alkyl, alkoxy or alkoxyalkyl group or the halogen atom.

Group (D) consists of anthraquinone-base dichromatic dye compounds represented by the following formula (X):

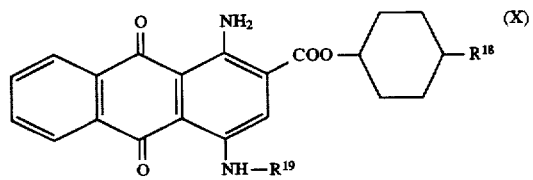

wherein $R^{18}$ and $R^{19}$ each represents a hydrogen atom, a linear or branched $C_{1-10}$ alkyl or alkoxyl group, a $C_{2-10}$ alkoxyalkyl group, a halogen atom such as fluorine, chlorine or bromine, or a cyclohexyl, phenyl, biphenyl or cyclohexylphenyl group which may be substituted by the above alkyl, alkoxy or alkoxyalkyl group or the halogen atom.

The components represented by the formulas (I) to (V) are known compounds. Described specifically, the component represented by the formula (I) is disclosed in Japanese Patent Provisional Publication No. 8-53469, the components represented by the formulas (II) and (III) in Japanese Patent Provisional Publication No. 7-70148, the component represented by the formula (IV) in Japanese Patent Provisional Publication No. 7-173176 and the component represented by the formula (V) in Japanese Patent Provisional Publication No. 7-291978.

Dye compounds represented by the formulas (VI) to (X) are also known. Described specifically, the dye compounds represented by the formulas (VI) are disclosed in Japanese Patent Provisional Publication No. 58-138767, the dye compounds represented by the formula (VII) in Japanese Patent Provisional Publication No. 59-22964, the dye compounds represented by the formula (VIII) in Japanese Patent Provisional Publication No. 63-301850, the dye compounds represented by the formula (IX) in Japanese Patent Provisional Publication No. 1-43596 and the dye compounds represented by the formula (X) in Japanese Patent Provisional Publication No. 59-4651.

As described above, the guest host liquid crystal composition of the present invention can be driven at a voltage lower than that for conventionally-used materials and at the same time has a high voltage holding ratio and a liquid crystal phase extending even to a high-temperature range.

Accordingly, the liquid crystal composition of the present invention is excellent as a material for liquid crystal display elements.

DETAILED DESCRIPTION OF THE PREFERRED EMBODIMENTS

A more detailed description will next be made of the above-described formulas.

$R^1$ in the formulas (I)–(V) represents a linear $C_{2-7}$ alkyl group such as ethyl, n-propyl, n-butyl, n-pentyl, n-hexyl or n-heptyl group.

$R^2$ in the formula (I) represents F or a linear $C_{1-3}$ alkoxy group such as methoxy, ethoxy or n-propoxy.

Specific examples of the cyclic structure of the formula (IV) include:

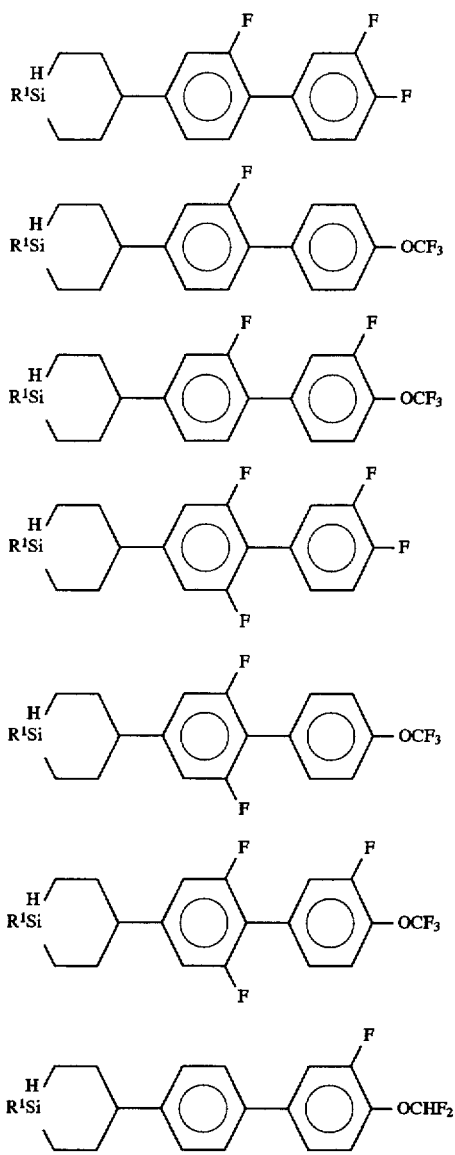

with the compounds represented by each of the formulas (IVb), (IVd), (IVe) and (IVg), being preferred from the viewpoints of low driving voltage and a liquid phase extending to a high temperature range.

It is preferred that the host liquid crystal composition comprises: 0–10 mol% of the compound presented by the formula (I); 30–65 mol% of the compound presented by the formula (II); 5–40 mol% of the compound presented by the formula (III); 2.5–50 mol% of the compound presented by the 10 formula (IV); and 5–18 mol% of the compound presented by the formula (V).

At least one or more compounds are selected from the compounds represented by each of the folumulas (I)–(V) to make up the above host liquid crystal composition and each silacyclohexane ring of compounds has a trans conformation.

It is preferred that the gest host liquid crystal composition comprises 0.5–15 wt % of dye compounds represented by general formulas (VI)–(X).

In $R^3$, $R^4$, $R^8$ to $R^{12}$ and $R^{16}$ to $R^{19}$ of the above formulas (VI) to (X), examples of the alkyl group include linear or branched $C_{1-10}$ alkyl groups such as methyl, ethyl, propyl, butyl, pentyl, hexyl, heptyl, octyl, nonyl or decyl; those of the alkoxy group include linear or branched $C_{1-10}$ alkoxy groups corresponding to the above-exemplified alkyl groups; those of the alkoxyalkyl group include linear or branched $C_{2-10}$ alkoxyalkyl groups such as methoxymethyl, butoxymethyl, ethoxyethyl or butoxyethyl; and those of the halogen atom include a fluorine, chlorine, bromine atom or the like. The above-exemplified groups can be given also as a substituent for the substituted cyclohexyl group, substituted phenyl group, substituted benzyl group, substituted cyclohexylmethyl group, substituted biphenyl group or substituted cyclohexylphenyl group in $R^3$, $R^4$, $R^8$ to $R^{10}$ and $R^{16}$ to $R^{19}$.

Examples of the halogen atom in $R^5$ to $R^7$ and $R^{13}$ to $R^{15}$ include fluorine, chlorine, bromine atoms and so on.

When $R^6$ and $R^7$, or $R^{14}$ and $R^{15}$ are coupled together, they may form a whole aromatic ring such as naphthylene group together with a phenylene group to which these groups have been bonded. Examples of the dye usable in the present invention are shown below in Tables 1–4 but it is needless to say that the present invention is not limited by these examples.

TABLE 1

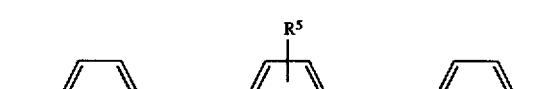

| | $R^3$ | $R^4$ | $R^5$ | $R^6$ | $R^7$ |
|---|---|---|---|---|---|
| VI-1 | $C_4H_9$ (n) | $CH_2$—⌬—$OC_4H_9(n)$ | H | coupled together to form a part of a naphthalene ring | |

TABLE 1-continued

| | | | | | |
|---|---|---|---|---|---|
| VI-2 | $C_8H_{17}$ (n) | $CH_2$—⟨phenyl⟩—$OC_5H_{11}$(n) | H | coupled together to form a part of a naphthalene ring | |
| VI-3 | $C_8H_{17}$ (n) | $CH_2$—⟨phenyl⟩—$OC_7H_{15}$(n) | H | coupled together to form a part of a naphthalene ring | |
| VI-4 | $C_4H_9$ (n) | $CH_2$—⟨phenyl⟩—$OC_4H_9$(n) | $CH_3$ | H | H |
| VI-5 | $OC_4H_9$ (n) | $CH_2$—⟨phenyl⟩—$C_4H_9$(n) | H | coupled together to form a part of a naphthalene ring | |
| VI-6 | $C_4H_9$ (n) | $CH_2$—⟨cyclohexyl⟩—$C_4H_9$(n) | H | coupled together to form a part of a naphthalene ring | |
| VI-7 | $C_4H_9$ (n) | $CH_2$—⟨phenyl⟩—Cl | H | coupled together to form a part of a naphthalene ring | |
| VI-8 | $C_8H_{17}$ (n) | $CH_2$—⟨phenyl⟩ | H | coupled together to form a part of a naphthalene ring | |
| VI-9 | $C_4H_9$ (n) | $CH_2$—⟨phenyl⟩ | H | coupled together to form a part of a naphthalene ring | |
| VI-10 | H | $CH_2$—⟨phenyl⟩ | H | coupled together to form a part of a naphthalene ring | |

VII $R^8$—⟨phenyl⟩—N=N—⟨phenyl⟩—N=N—⟨quinoline⟩—NHCH$_2$—⟨phenyl⟩—$R^9$

Dye

TABLE 2 continued from Table 1

| | $R^8$ | $R^9$ |
|---|---|---|
| VII-1 | $C_4H_9$ (n) | $OC_4H_9$ (n) |
| VII-2 | $C_4H_9$ (n) | $OC_5H_{11}$ (n) |
| VII-3 | $C_4H_9$ (n) | H |
| VII-4 | $OC_3H_7$ (n) | $OC_4H_9$ (n) |
| VII-5 | Br | $OC_4H_9$ (n) |
| VII-6 | Br | $C_4H_9$ (n) |
| VII-7 | $C_4H_9$ (n) | $C_7H_{15}$ (n) |
| VII-8 | $OCH_2$—⟨phenyl⟩—$C_4H_9$(n) | Cl |

TABLE 2-continued

VIII

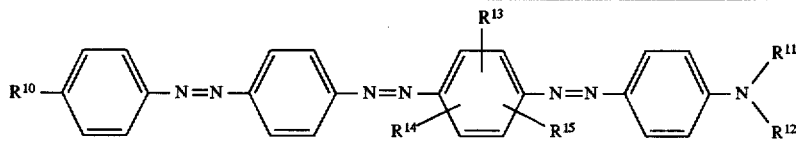

| Dye | $R^{10}$ | $R^{11}$ | $R^{12}$ | $R^{13}$ | $R^{14}$ | $R^{15}$ |
|---|---|---|---|---|---|---|
| VIII-1 | $C_4H_9$ (n) | $C_2H_5$ | $C_2H_5$ | H | coupled together to form a part of a napthalene ring | |
| VIII-1 | $C_8H_{17}$ (n) | $C_2H_5$ | $C_2H_5$ | H | coupled together to form a part of a napthalene ring | |
| VIII-1 | $C_4H_9$ (n) | $C_3H_7$ (n) | $C_3H_7$ (n) | H | coupled together to form a part of a napthalene ring | |
| VIII-1 | $C_4H_9$ (n) | $C_2H_5$ | $C_2H_5$ | H | H | H |

TABLE 3 continued from Table 2

IX

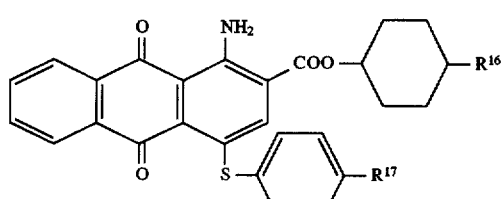

| Dye | $R^{16}$ | $R^{17}$ |
|---|---|---|
| IX-1 | $C_4H_9$ (n) | $CH_3$ |
| IX-2 | $C_6H_{13}$ (n) | $CH_3$ |
| IX-3 | $C_8H_{17}$ (n) | $CH_3$ |
| IX-4 | $C_4H_9$ (n) | $OCH_3$ |
| IX-5 | $CH_2-O-CH_3$ | H |
| IX-6 | $OC_2H_5$ | ⌬-$C_4H_9$(t) |
| IX-7 | $C_4H_9$ (t) | Cl |

X

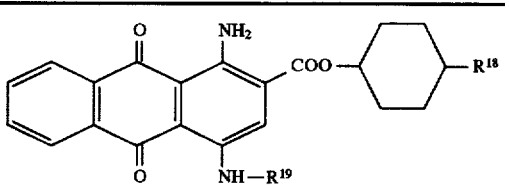

| Dye | $R^{18}$ | $R^{19}$ |
|---|---|---|
| X-1 | $C_4H_9$ (n) | H |
| X-2 | $C_6H_{13}$ (n) | H |

TABLE 4 continued from Table 3

| | | |
|---|---|---|
| X-3 | $C_8H_{17}$ (n) | $C_5H_{11}$ (n) |
| X-4 | $C_4H_9$ (t) | $C_5H_{11}$ (n) |
| X-5 | $C_2H_4-O-CH_3$ | H |
| X-6 | $C_7H_{15}$ (n) | H |
| X-7 | $C_4H_9$ (n) | ⌬-$C_4H_9$(n) |
| X-8 | $C_4H_9$ (n) | ⌬-$C_8H_{17}$(n) |
| X-9 | $C_3H_7$ (n) | ⌬-Cl |
| X-10 | $C_4H_9$ (n) | ⌬-$OCH_3$ |
| X-11 | $C_8H_{17}$ (n) | ⌬ |
| X-12 | $C_8H_{17}$ (n) | ⌬-$C_8H_{17}$(n) |
| X-13 | $C_4H_9$ (n) | ⌬-$C_8H_{17}$(n) |
| X-14 | $C_4H_9$ (n) | ⌬-⌬-$C_4H_9$(n) |

The guest host liquid crystal composition according to the present invention can be prepared easily by dissolving at least one dye compound selected from each of the groups (A), (B), (C) and (D), into at least one host liquid crystal selected from each of the formulas (I) to (V), by a mechanically mixing and stirring operation, and well-known technique such as heating and supersonic waves.

The dye compound is used in an amount of 0.1 to 15 wt.%, preferably 0.5 to 5 wt.% based on the host liquid crystal material. By sandwiching a liquid crystal composition so prepared between two electrode substrates, at least one of said substrates being transparent, various display elements making use of guest host effects can be formed. Examples of such display element include a Heilmeier type guest host which is described in "LIQUID CRYSTAL DEVICE HANDBOOK", edited by the 142-nd committee of the Japan Society for the Promotion of Science, p. 315–329 (1989), Nikkan Kogyo Shinbunsha, a phase transfer type guest host, or a polymer-dispersion type guest host which is described in p. 367–370 in the above "LIQUID CRYSTAL DEVICE HANDBOOK".

The guest host liquid crystal composition of the present invention may be added an additive such as an optically active substance, e.g., cholesteryl nonanoate, ultraviolet absorber and/or antioxidant.

The present invention will hereinafter be described in more detail by Examples. Incidentally, the properties of the mixture which will be described in Examples were measured under the following conditions. The definition of each symbol is also shown together.

$T_{NI}$=Nematic-isotropic transition temperature (°C.)

$V_{th}$=Threshold voltage

Cell electrode area=1 cm², cell gap: 8 μm (TN cell)

Orientation film: Polyimide "LX-1400", trade name; product of Hitachi Chemical Co., Ltd.

Deflection plate: The plate is installed above the panel so that the plate and the orientation direction may cross each other.

Measuring frequency: 32 Hz short wave

Measuring temperature: 25° C.

The threshold voltage Vth means an applied voltage at the time when a transmittance starts increasing upon measurement under the above conditions.

VHR: voltage holding ratio

Cell electrode area: 1 cm², cell gap: 5 μm (TN cell)

Orientation film: Polyimide "AL-1051", trade name; product of Japan Synthetic Rubber Co., Ltd.

Measuring frequency: 30 Hz short wave

Measuring temperature: 100° C.

Pulse width: 60 μsec (±5 V TTL)

The voltage holding ratio VHR means a holding ratio of a voltage waveform between electrodes upon measurement under the above-described conditions.

S value: order parameter value

After the polyimide resin "LX-1400" was applied and hardened, the cell was rubbed and subjected to homogeneous orientation treatment. The cell so treated was exposed to light polarized in parallel with the orientation treatment direction and light polarized perpendicular to the orientation treatment direction and absorbance was measured in both cases. In accordance with the following equation:

$S=(A_{\parallel}-A_{\perp})/(A_{\parallel}+2A_{\perp})$ wherein $A_{\parallel}$ is an absorbance upon exposure to light polarized parallel to the orientation of the cell and $A_{\perp}$ is an absorbance upon exposure to light polarized vertical to the orientation of the cell, an order parameter value was calculated.

Dye Solubility Test

The guest host liquid crystal composition obtained by mixing a dichromatic dye compound with a liquid crystal composition to dissolve the latter in the former was poured in a glass bottle and they were allowed to stand for 300 hours in a low-temperature thermostat set at −20° C. The guest host liquid crystal composition was then taken out from the thermostat and existence or absence of the precipitation of the dichromatic dye compounds was confirmed.

EXAMPLE 1

To 1 g of a mixture, as a host liquid crystal composition, composed of:

5.7 mole % of 4-(trans-4-n-pentyl-4-silacyclohexyl)-1-methoxybenzene, 13.4 mole % of 4-[trans-4-(trans-4-n-propyl-4-silacyclohexyl) cyclohexyl]-1,2-difluorobenzene, 15.8 mole % of 4-[trans-4-(trans-4-n-pentyl-4-silacyclohexyl) cyclohexyl]-1,2-difluorobenzene, 19.2 mole % of 4-[trans-4-(trans-4-n-propyl-4-silacyclohexyl) cyclohexyl]-1,2,6-trifluorobenzene, 10.1 mole % of 4-[trans-4-(trans-4-n-pentyl-4-silacyclohexyl) cyclohexyl]-1,2,6-trifluorobenzene, 9.0 mole % of 4-[trans-4-(trans-4-n-propyl-4-silacyclohexyl) cyclohexyl]-1-trifluoromethoxybenzene, 6.4 mole % of 4-[trans-4-(trans-4-n-pentyl-4-silacyclohexyl) cyclohexyl]-1-trifluoromethoxybenzene, 2.4 mole % of 4'-(trans-4-n-propyl-4-silacyclohexyl)-3,4,2',6'-tetrafluorobiphenyl, 3.3 mole % of 4'-(trans-4-n-pentyl-4-silacyclohexyl)-3,4,2',6'-tetrafluorobiphenyl, 8.1 mole % of trans,trans-4-[4-(4-n-propyl-4-silacyclohexyl) cyclohexyl]-3',4',5'-trifluorobiphenyl, and 6.6 mole % of trans,trans-4-[4-(4-n-pentyl-4-silacyclohexyl) cyclohexyl]-3',4',5'-trifluorobiphenyl, a mixture of the below-described compounds out of the dichromatic dye compounds shown above in Tables 1–4 was added as guest dyes to dissolve the latter in the former, whereby a guest host liquid crystal composition was prepared.

| VI-3 | 3.8 mg, |
|---|---|
| VI-2 | 3.6 mg, |
| VII-1 | 2.0 mg, |
| VIII-1 | 5.0 mg, |
| X-7 | 10.0 mg, and |
| X-8 | 11.0 mg. |

The liquid crystal composition so obtained has the following properties:

$T_{NI}$=86.3° C.

$V_{th}$=1.39 V

VHR=99.2%

S values calculated in accordance with the above equation are shown below:

| Wavelength (nm) | S value |
| --- | --- |
| 450 | 0.74 |
| 500 | 0.74 |
| 550 | 0.74 |
| 600 | 0.73 |

In the dye solubility test of the guest host liquid crystal composition, no precipitation of the dichromatic dye compounds were observed.

EXAMPLE 2

To 1 g of a mixture, as a host liquid crystal composition, composed of:

18.2 mole % of 4-[trans-4-(trans-4-n-propyl-4-silacyclohexyl) cyclohexyl]-1,2-difluorobenzene, 21.4 mole % of 4-[trans-4-(trans-4-n-pentyl-4-silacyclohexyl) cyclohexyl]-1,2-difluorobenzene, 11.6 mole % of 4-[trans-4-(trans-4-n-propyl-4-silacyclohexyl) cyclohexyl]-1,2,6-trifluorobenzene, 6.1 mole % of 4-[trans-4-(trans-4-n-pentyl-4-silacyclohexyl) cyclohexyl]-1,2,6-trifluorobenzene, 18.0 mole % of 4-[trans-4-(trans-4-n-propyl-4-silacyclohexyl) cyclohexyl]-1-trifluoromethoxybenzene, 12.9 mole % of 4-[trans-4-(trans-4-n-pentyl-4-silacyclohexyl) cyclohexyl]-1-trifluoromethoxybenzene, 1.4 mole % of 4'-(trans-4-n-propyl-4-silacyclohexyl)-3,4,2',6'-tetrafluorobiphenyl, 1.9 mole % of 4'-(trans-4-n-pentyl-4-silacyclohexyl)-3,4,2',6'-tetrafluorobiphenyl, 4.7 mole % of trans,trans-4-[4-(4-n-propyl-4-silacyclohexyl) cyclohexyl]-3',4',5'-trifluorobiphenyl, and 3.8 mole % of trans,trans-4-[4-(4-n-pentyl-4-silacyclohexyl) cyclohexyl]-3',4',5'-trifluorobiphenyl, the dichromatic dye compounds employed in Example 1 were added as guest dyes to dissolve the latter in the former, whereby a guest host liquid crystal composition was prepared.

The liquid crystal composition so obtained has the following properties:

$T_{NI}$=92.0° C.

$V_{th}$=1.51 V

VHR=99.5%

S values calculated in accordance with the above equation are shown below:

| Wavelength (nm) | S value |
| --- | --- |
| 450 | 0.73 |
| 500 | 0.76 |
| 550 | 0.75 |
| 600 | 0.74 |

In the dye solubility test of the guest host liquid crystal composition, no precipitation of the dichromatic dye compounds were observed.

EXAMPLE 3

To 1 g of a mixture, as a host liquid crystal composition, composed of:

4.2 mole % of 4-[trans-4-(trans-4-n-propyl-4-silacyclohexyl) cyclohexyl]-1,2-difluorobenzene, 5.0 mole % of 4-[trans-4-(trans-4-n-pentyl-4-silacyclohexyl) cyclohexyl]-1,2-difluorobenzene, 21.5 mole % of 4-[trans-4-(trans-4-n-propyl-4-silacyclohexyl) cyclohexyl]-1,2,6-trifluorobenzene, 11.4 mole % of 4-[trans-4-(trans-4-n-pentyl-4-silacyclohexyl) cyclohexyl]-1,2,6-trifluorobenzene, 21.3 mole % of 4-[trans-4-(trans-4-n-propyl-4-silacyclohexyl) cyclohexyl]-1-trifluoromethoxybenzene, 15.3 mole % of 4-[trans-4-(trans-4-n-pentyl-4-silacyclohexyl) cyclohexyl]-1-trifluoromethoxybenzene, 2.5 mole % of 4'-(trans-4-n-propyl-4-silacyclohexyl)-3,4,2',6'-tetrafluorobiphenyl, 3.5 mole % of 4'-(trans-4-n-pentyl-4-silacyclohexyl)-3,4,2',6'-tetrafluorobiphenyl, 8.4 mole % of trans,trans-4-[4-(4-n-propyl-4-silacyclohexyl) cyclohexyl]-3',4',5'-trifluorobiphenyl, and 6.9 mole % of trans,trans-4-[4-(4-n-pentyl-4-silacyclohexyl) cyclohexyl]-3',4',5'-trifluorobiphenyl, the dichromatic dye compounds employed in Example 1 were added as guest dyes to dissolve the latter in the former, whereby a guest host liquid crystal composition was prepared.

The liquid crystal composition so obtained has the following properties:

$T_{NI}$=97.3° C.

$V_{th}$=1.46 V

VHR=99.4%

S values calculated in accordance with the above equation are shown below:

| Wavelength (nm) | S value |
| --- | --- |
| 450 | 0.74 |
| 500 | 0.75 |
| 550 | 0.75 |
| 600 | 0.74 |

In the dye solubility test of the guest host liquid crystal composition, no precipitation of the dichromatic dye compounds were observed.

EXAMPLE 4

To 1 g of the liquid crystal composition, which had been employed in Example 2, as a host liquid crystal composition, a mixture of the below-described compounds out of the dichromatic dye compounds described above in Tables 1–4 was added to dissolve the latter in the former, whereby a guest host liquid crystal composition was prepared.

| VI-3 | 5.0 mg, |
| VI-2 | 4.8 mg, |
| VII-1 | 2.6 mg, |
| VIII-1 | 2.6 mg, |
| IX-2 | 3.2 mg, |
| IX-3 | 3.3 mg, |
| X-1 | 2.5 mg, |

|     |          |
| --- | -------- |
| X-3 | 2.8 mg,  |
| X-7 | 8.8 mg, and |
| X-8 | 9.6 mg.  |

The liquid crystal composition so obtained has the following properties:

$T_{NI}=92.0°$ C.

$V_{th}=1.53$ V

VHR=99.2%

S values calculated in accordance with the above equation are shown below:

| Wavelength (nm) | S value |
| --- | --- |
| 503 | 0.73 |
| 560 | 0.73 |
| 616 | 0.73 |

In the dye solubility test of the guest host liquid crystal composition, no precipitation of the dichromatic dye compounds were observed.

EXAMPLE 5

To 1 g of the liquid crystal composition, which had been employed in Example 2, as a host liquid crystal composition, a mixture of the below-described compounds out of the dichromatic dye compounds described above in Tables 1–4 were added to dissolve the latter in the former, whereby a guest host liquid crystal composition was prepared.

|       |              |
| ----- | ------------ |
| VI-8  | 6.4 mg,      |
| VII-1 | 2.5 mg,      |
| VIII-1 | 4.4 mg,     |
| X-7   | 13.0 mg, and |
| X-8   | 14.3 mg.     |

The liquid crystal composition so obtained has the following properties:

$T_{NI}=92.0°$ C.

$V_{th}=1.55$ V

VHR=99.2%

S values calculated in accordance with the above equation are shown below:

| Wavelength (nm) | S value |
| --- | --- |
| 462 | 0.71 |
| 494 | 0.73 |
| 555 | 0.73 |
| 590 | 0.72 |

In the dye solubility test of the guest host liquid crystal composition, no precipitation of the dichromatic dye compounds were observed.

EXAMPLE 6

To 1 g of a mixture, as a host liquid crystal composition, composed of:

9.7 mole % of 4-[trans-4-(trans-4-n-propyl-4-silacyclohexyl) cyclohexyl]-1,2-difluorobenzene, 11.5 mole % of 4-[trans-4-(trans-4-n-pentyl-4-silacyclohexyl) cyclohexyl]-1,2-difluorobenzene, 10.4 mole % of 4-[trans-4-(trans-4-n-propyl-4-silacyclohexyl) cyclohexyl]-1,2,6-trifluorobenzene, 5.5 mole % of 4-[trans-4-(trans-4-n-pentyl-4-silacyclohexyl) cyclohexyl]-1,2,6-trifluorobenzene, 3.3 mole % of 4-[trans-4-(trans-4-n-propyl-4-silacyclohexyl) cyclohexyl]-1-trifluoromethoxybenzene, 2.3 mole % of 4-[trans-4-(trans-4-n-pentyl-4-silacyclohexyl) cyclohexyl]-1-trifluoromethoxybenzene, 16.6 mole % of 4'-(trans-4-n-propyl-4-silacyclohexyl)-3-fluoro-4-difluoromethoxybiphenyl, 20.7 mole % of 4'-(trans-4-n-pentyl-4-silacyclohexyl)-3-fluoro-4-difluoromethoxybiphenyl, 4.2 mole % of 4'-(trans-4-n-propyl-4-silacyclohexyl)-3,4,2',6'-tetrafluorobiphenyl, 5.8 mole % of 4'-(trans-4-n-pentyl-4-silacyclohexyl)-3,4,2',6'-tetrafluorobiphenyl, 5.5 mole % of trans,trans-4-[4-(4-n-propyl-4-silacyclohexyl) cyclohexyl]-3',4',5'-trifluorobiphenyl, and 4.5 mole % of trans,trans-4-[4-(4-n-pentyl-4-silacyclohexyl) cyclohexyl]-3',4',5'-trifluorobiphenyl, the dichromatic dye compounds employed in Example 4 were added to dissolve the latter in the former, whereby a guest host liquid crystal composition was prepared.

The liquid crystal composition so obtained has the following properties:

$T_{NI}=84.8°$ C.

$V_{th}=1.36$ V

VHR=99.0%

S values calculated in accordance with the above equation are shown below:

| Wavelength (nm) | S value |
| --- | --- |
| 616 | 0.70 |

In the dye solubility test of the guest host liquid crystal composition, no precipitation of the dichromatic dye compounds were observed.

EXAMPLE 7

To 1 g of the liquid crystal composition, which had been employed in Example 6, as a host liquid crystal composition, dichromatic dye compounds employed in Example 5 were added to dissolve the latter in the former, whereby a guest host liquid crystal composition was prepared.

The liquid crystal composition so obtained has the following properties:

$T_{NI}=84.8°$ C.

$V_{th}=1.42$ V

VHR=99.0%

S values calculated in accordance with the above equation are shown below:

| Wavelength (nm) | S value |
| --- | --- |
| 462 | 0.73 |
| 494 | 0.73 |
| 555 | 0.72 |
| 590 | 0.72 |

In the dye solubility test of the guest host liquid crystal composition, no precipitation of the dichromatic dye compounds were observed.

COMPARATIVE EXAMPLE

To a liquid crystal composition which served as a host liquid crystal composition and was mainly composed of a fluorine-base liquid crystal compound commercially available as "ZLI-4792" (trade name; product of E. MERCK AG), dichromatic dye compounds employed in Example 1 were added as guest dyes to dissolve the latter in the former, whereby a guest host liquid crystal composition was prepared. The liquid crystal composition so obtained has the following properties:

$T_{NI}$=95° C.

$V_{th}$=1.84 V

VHR=99.4%

S values calculated in accordance with the above equation are as follows:

| Wavelength (nm) | S value |
| --- | --- |
| 450 | 0.75 |
| 500 | 0.76 |
| 550 | 0.77 |
| 600 | 0.75 |

What is claimed is:

1. A guest host liquid crystal composition which comprise as a host liquid crystal a liquid crystal composition containing at least:

0 to 15 mole % of a first component represented by the following formula (I):

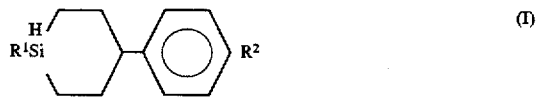

wherein $R^1$ represents a linear $C_{2-7}$ alkyl group and $R^2$ represents F or a linear $C_{1-3}$ alkoxy group, 20 to 70 mole % of a second component represented by the following formula (II):

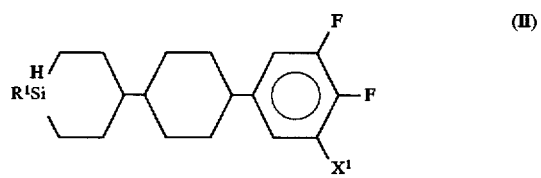

wherein $R^1$ is as defined for the general formula (I) and $X^1$ represents H or F, 5 to 40 mole % of a third component represented by the following formula (III):

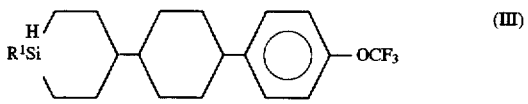

wherein $R^1$ is as defined for the general formula (I), 0 to 50 mole % of a fourth component represented by the following formula (IV):

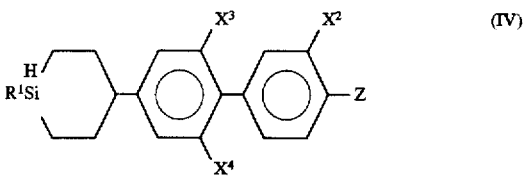

wherein $R^1$ is as defined for the general formula (I), $X^2$, $X^3$ and $X^4$ represent H or F, and Z represents F, $OCF_3$ or $OCHF_2$, and 5 to 20 mole % of a fifth component represented by the following formula (V):

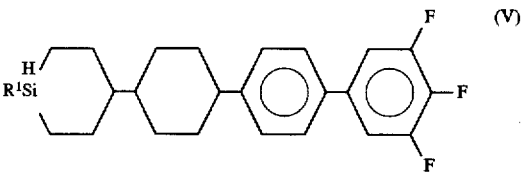

wherein $R^1$ is as defined for the general formula (I); and
at least one dichromatic dye compound selected from each of the below-described Group (A), Group (B), Group (C) and Group (D), wherein:

Group (A) consists of azo-base dichromatic dye compounds represented by the following formula (VI):

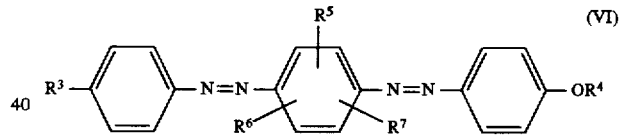

wherein $R^3$ represents a hydrogen atom, a linear or branched $C_{1-10}$ alkyl or $C_{1-10}$ alkoxyl group, a $C_{2-10}$ alkoxyalkyl group, a halogen atom, or a cyclohexyl or phenyl group which may be substituted by the above alkyl, alkoxy or alkoxyalkyl group or the halogen atom; $R^4$ represents a linear or branched $C_{1-10}$ alkyl or $C_{1-10}$ alkoxy group, a $C_{2-10}$ alkoxyalkyl group, a halogen atom, or a cyclohexylmethyl or benzyl group which may be substituted by the above alkyl, alkoxy or alkoxyalkyl group, or the halogen atom; $R^5$ to $R^7$ each represents a hydrogen atom, a methyl group, a methoxy group or a halogen atom and when $R^6$ and $R^7$ are coupled to an adjacent carbon, they may form an aromatic ring which is a part of a naphthalene ring, Group (B) consists of azo-base dichromatic dye compounds represented by the following formula (VII):

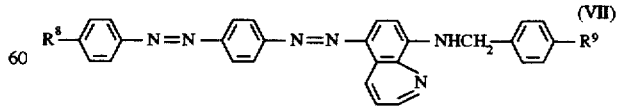

wherein $R^8$ and $R^9$ each represents a hydrogen atom, a linear or branched $C_{1-10}$ alkyl or $C_{1-10}$ alkoxyl group, a $C_{2-10}$ alkoxyalkyl group, a halogen atom, or a cyclohexyl or phenyl group which may be substituted by the above alkyl, alkoxy or alkoxyalkyl group or the halogen atom, Group (C) consists of azo-base dichromatic dye compounds represented by the following formula (VIII):

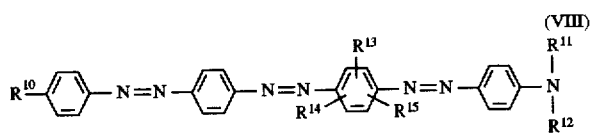

wherein $R^{10}$ represents a hydrogen atom, a linear or branched $C_{1-10}$ alkyl or $C_{1-10}$ alkoxyl group, a $C_{2-10}$ alkoxyalkyl group, a halogen atom, or a cyclohexyl or phenyl group which may be substituted by the above alkyl, alkoxy or alkoxyalkyl group or the halogen atom; $R^{11}$ and $R^{12}$ each represents a linear or branched $C_{1-10}$ alkyl group; and $R^{13}$ to $R^{15}$ each represents a hydrogen atom, a methyl group, a methoxy group or a halogen atom, and when $R^{14}$ and $R^{15}$ are coupled to an adjacent carbon, they may form an aromatic ring which is a part of a naphthalene ring; and anthraquinone-base dichromatic dye compounds represented by the following formula (IX):

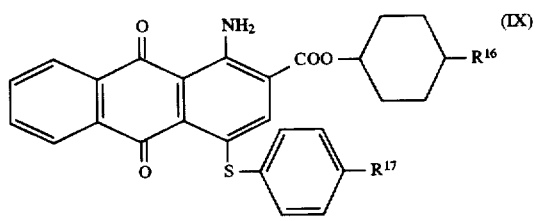

wherein $R^{16}$ and $R^{17}$ each represents a hydrogen atom, a linear or branched $C_{1-10}$ alkyl or $C_{1-10}$ alkoxyl group, a $C_{2-10}$ alkoxyalkyl group, a halogen atom, or a cyclohexyl or phenyl group which may be substituted by the above alkyl, alkoxy or alkoxyalkyl group or the halogen atom, and Group (D) consists of anthraquinone-base dichromatic dye compounds represented by the following formula (X):

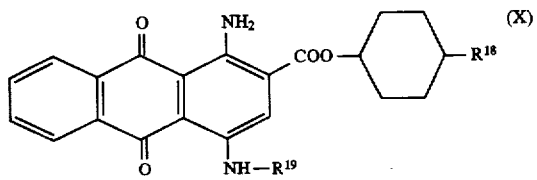

wherein $R^{18}$ and $R^{19}$ each represents a hydrogen atom, a linear or branched $C_{1-10}$ alkyl or $C_{1-10}$ alkoxyl group, a $C_{2-10}$ alkoxyalkyl group, a halogen atom, or a cyclohexyl, phenyl, biphenyl or cyclohexylphenyl group which may be substituted by the above alkyl, alkoxy or alkoxyalkyl group or the halogen atom.

2. A guest host liquid crystal composition according to claim 1 wherein said fourth component represented by the general formula (IV) is one or more compounds selected from a group consisting of the following formulas (IVb), (IVd), (IVe) and (IVg):

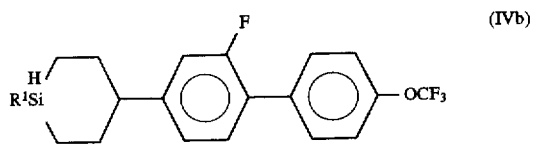

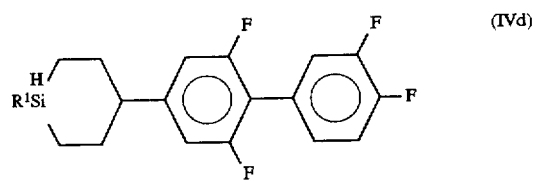

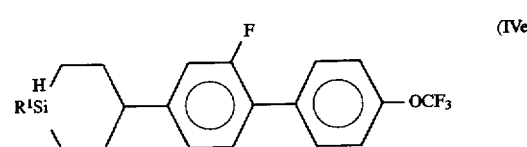

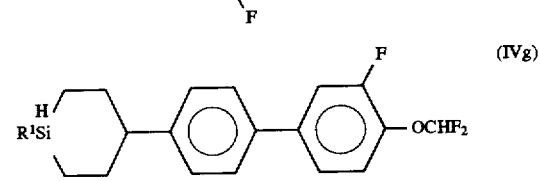

wherein $R^1$ is as defined for the general formula (I).

3. A guest host liquid crystal composition according to claim 1 wherein said gest host liquid crystal composition comprises 0.1–15 wt % of dye compounds represented by general formulas (VI)–(X).

4. A guest host liquid crystal composition according to claim 2 wherein said gest host liquid crystal composition comprises 0.1–15 wt % of dye compounds represented by general formulas (VI)–(X).

5. A liquid crystal display element comprising a guest host liquid composition according to claim 1.

6. A liquid crystal display element comprising a guest host liquid composition according to claim 2.

7. A liquid crystal display element comprising a guest host liquid composition according claim 3.

8. A liquid crystal display element comprising a guest host liquid composition according to claim 4.

* * * * *